(12) United States Patent
Chandel et al.

(10) Patent No.: US 9,418,585 B2
(45) Date of Patent: Aug. 16, 2016

(54) DYNAMIC IMAGE MODIFICATION FOR A COLOR DEFICIENT USER

(71) Applicant: Tata Consultancy Services Limited, Maharashtra (IN)

(72) Inventors: Priyanka Chandel, Maharashtra (IN); Pankaj Doke, Maharashtra (IN); Sylvan Lobo, Maharashtra (IN); Kushal Gore, Maharashtra (IN); Ramiz Raza, Maharashtra (IN); Sujit Devkar, Maharashtra (IN); Praveen Sunka, Maharashtra (IN); Sanjay Kimbahune, Maharashtra (IN)

(73) Assignee: Tata Consultancy Services Limited, Maharashtra (IN)

( * ) Notice: Subject to any disclaimer, the term of this patent is extended or adjusted under 35 U.S.C. 154(b) by 128 days.

(21) Appl. No.: 14/010,899

(22) Filed: Aug. 27, 2013

(65) Prior Publication Data

US 2014/0055506 A1  Feb. 27, 2014

(30) Foreign Application Priority Data

Aug. 27, 2012  (IN) .................. 2487/MUM/2012

(51) Int. Cl.
*G09G 5/10* (2006.01)
*G09G 3/20* (2006.01)
*G06F 3/147* (2006.01)
*G09G 5/02* (2006.01)

(52) U.S. Cl.
CPC .............. *G09G 3/2003* (2013.01); *G06F 3/147* (2013.01); *G09G 5/02* (2013.01); *G09G 2330/021* (2013.01); *G09G 2354/00* (2013.01)

(58) Field of Classification Search
CPC ............ G06F 3/147; G09G 2330/021; G09G 2354/00; G09G 3/2003; G09G 5/02
USPC ........................ 345/156–184; 715/865, 866
See application file for complete search history.

(56) References Cited

U.S. PATENT DOCUMENTS

| | | | |
|---|---|---|---|
| 2,453,335 A | 11/1948 | Morris | |
| 6,931,151 B2 | 8/2005 | Weast | |
| 7,145,571 B2 | 12/2006 | Jones et al. | |
| 7,916,152 B2 | 3/2011 | Jones et al. | |
| 2010/0127638 A1* | 5/2010 | Lan .................... | H05B 33/0863 315/294 |
| 2012/0092318 A1* | 4/2012 | Mishra et al. ................. | 345/211 |
| 2012/0147163 A1* | 6/2012 | Kaminsky ....................... | 348/62 |

OTHER PUBLICATIONS

Ann Smarty, "3 Easy-to-Use Online Color-Blindness Simulators", Sep. 26, 2011.
Nokia, "Color Detector".
Jia-Bin Huang, Sih-Ying Wu, and Chu-Song Chen, "Enhancing Color Representation for the Color Vision Impaired", Taiwan.

(Continued)

*Primary Examiner* — Kumar Patel
*Assistant Examiner* — Insa Sadio
(74) *Attorney, Agent, or Firm* — Hayes Soloway PC (57) ABSTRACT

A system and method for detecting spectrum of colors that is indistinguishable to a color blind individual and modifying the colors to fade in or out to the shade of same color, is provided. While the partial color blind user is enabled to view and better distinguish colors that were problematic earlier, the present invention achieves a significant reduction in power consumption of the display device with this modified color set.

6 Claims, 4 Drawing Sheets (56) References Cited

OTHER PUBLICATIONS

Daniel Flück, "15 Tools If You Are (Not) Colorblind", Dec. 23, 2008.
Farshad, "Washer Helps Color Blind People View Monitor Screen in Grey Color" Oct. 24, 2011.
Color Matters, "Tests for Computer Color Accuracy".
Ken Wakita, Kenta Shimamura,Smart Color: Disambiguation Framework of the colourblind*,Tokyo Institute of Technology, Japan.
Luke Jefferson, Richard Harvey, "An Interface to Support Color Blind Computer Users",School of Computing Sciences , University of East Anglia.

* cited by examiner

DYNAMIC IMAGE MODIFICATION FOR A COLOR DEFICIENT USER

FIELD OF THE INVENTION

The invention generally relates to color blind systems, and more particularly to an image display device for color blind users that is capable of achieving reduction in power consumption.

BACKGROUND OF THE INVENTION

Numerous image display devices are now being widely employed to deliver information electronically and visually and usually with color coded information. Most vivid examples of such display devices can be television receivers, personal computers and mobile devices.

Most commonly, such color coded information is mostly observed in mobile devices that today have penetrated all barriers and boundaries and today exist in hands of every other person. Looking at current market trends the smart phones usage has been increased tremendously. Particularly these smart phones provide most of its elaborate representations in color coded format especially when people leverage plethora of its embedded applications including internet, maps, applications, games and the like.

Along with the available useful features, these smart phones and advanced electronic display devices are plagued with few limitations, more significantly referencing to speedy discharge of battery. There could be many possible reasons and well reasoned arguments for this quick discharge, like GPRS usage, GPS connectivity, auto synchronization with mail box, live wallpapers, etc.

Yet other most impairing effect is on individuals experiencing some form of color blindness which renders their overall color perceptive ability deficient. Though more specifically "color blindness" refers to a condition wherein the person is visually impaired from perceiving a specific color and is only able to see shades of black and white; for the purposes of the present invention, reference is made to "partially color blind" individuals, wherein a person has, nevertheless, a deficient color perceptive ability as compared to someone with normal vision. Thus "users" of the present invention are considered to have partial color deficient vision, and not those who have completely lost the ability to distinguish certain colors. In partial color blindness one of the three basic color mechanism or cone pigment is either absent or non functioning or altered in its spectral sensitivity.

Color vision deficiency is present in a percentage of the human population, who are not able to distinguish between certain color set. Considering the fact that partial color blind people are not able to appreciate few colors and these bright colors also being responsible for quick discharge of battery from display devices, it is obvious not to show those colors to the respective user, as this will also, eventually assist in saving considerable amount of power of display devices.

There exists some solutions in the prior art, which discuss the approach of remapping the specific color information from one color space to other, either white or black; however this has occasionally resulted in a distorted image or display. The technique is though suited aptly for pie charts or dashboards, but graphics. Moreover, the prior art do not consider how much power the new pixel values will consume.

What are needed therefore are a method and a system that is capable of providing "of-relevant" color information to the color blind user and at the same time improvising power consumption rate of the display devices.

SUMMARY

Accordingly, the present invention is directed to a method of providing customized images to partial color blind users on a display device that, in turn, is capable of operating at significantly reduced power intake.

In one aspect of the invention, a method of image processing provided herein is characterized in displaying a customized image to a partial color deficient user over a display device for which an operating parameter is to be minimized, the method comprising the steps of: Detecting a color for which the user is color deficient; Providing a spectrum selection arrangement wherein the image referencing plurality of shades for a color to which the user is detected deficient is displayed in an order of increasing intensity for determining corresponding color spectrum that renders the user partial color deficient; Identifying color pixels corresponding to the determined color spectrum and computing red-green-blue values thereof; and replacing the identified color pixels with pixels of red-green-blue value next lower to previously computed red-green-blue value, to generate the customized image capable of minimizing the operating power of the display device, said next lower value not falling within the user deficient color spectrum.

In one other aspect of the invention, an image processing system configured to display a customized image to a partial color deficient user over a display device for which an operating parameter is to be minimized is provided. The system herein comprising: a data memory having stored therein a color space defined by one or more colors associated with the image, each color having one or more shades; a detector operable to detect a user deficient color and corresponding color spectrum that renders the user partial color deficient; an analyzer to determine color pixels corresponding to the detected color spectrum and compute red-green-blue value thereof; and an image modifier to modify the identified color pixels with pixels of red-green-blue value next lower to previously computed red-green-blue value, and generate the customized image capable of minimizing the operating power of the display device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

In one embodiment, the techniques and invention described herein employs an electronic display device that provides a customized display of image to a partial color blind user enabling him distinguish between various colors, at reduced power consuming rates. More specifically, the systems and methods described herein involve selection of user color deficient spectrum to replace with low power images consisting of darker shades (shades with lower RGB values) of selected color. In one embodiment, the systems and methods described herein detects the entire spectrum of the color to which the user is reported deficient and later modify the color information such that the user is now able to distinguish between colors and at the same time, the device being replaced with low power images, operates at significantly power consumption rates.

In other preferred embodiment, the dynamically varying range of user's perceptivity to various colors is detected. In response to input received, a mathematical model is approximated for the user taking into consideration his sensitivity to color information. Thereafter, analysis is performed on a pixel by pixel basis to dynamically modify and update the images or wallpapers used on the electronic display devices, without any distortion. The display devices defines all such electronic devices that operates on battery to display colored visual information, including but not limited to mobile devices-smart phones, television receivers or personal computers. By performing this operation, the system is assisted in significantly reducing its power consumption rate besides providing the color blind user flexibility to see images at an approximation.

Hereinafter, the image display device of the present invention will be referred to as mobile device for simplicity. Furthermore, most of the terminologies used in the description of the present invention are generally known terms. However, in some cases, terminologies specifically chosen by the inventor will also be used herein, the terminologies of which will be fully explained in the detailed description of the present invention. Therefore, the details of the present invention should not be understood based on such terminologies only, but by the meaning of the terms lying within the purpose of the present invention.

Broadly, the system comprises of three modules: a data memory storing a color space defined by one or more colors associated with the image, wherein each color further comprise of its various shade components; a Color blindness detector to detect the color spectrum which is not perceived by a user with impaired color vision; an analyzer to check on pixel by pixel basis color information associated with an image prior to its display on the display device by making a determination to replace sections of the image not detected by the user with the shades consuming less power, and detected by the user. Finally an image modifier dynamically updates the images to be displayed on the screen in a format and shades that are more easily perceived by the user.

The systems and methods described herein aid in generating and dynamically detecting and subsequently modifying graphics sub system in response to color-vision impaired individual's perceptivity to color-coded information. The system assists in reducing the battery consumption of the mobile device without changing the device or its display.

In one embodiment, the system of the present invention stores the color space and shades of various colors which are differentially then revealed and further stores a plurality of shade patterns for testing a user's partial color blindness. The system further deploys a color blindness detector to check for the color sense of the individual. The detector identifies the color band which a user is not able to appreciate by showing a set of images. In an embodiment, the system shows an image with rainbow colors. Further, it shows four images to the user from which user have to select one which is same as the one which system has showed first. The system shows the band of colors based on person's blindness.

For instance, if a person is detected red color blind, the system shows a set of images to the user to find out the specific range/band of that particular color. The image may be shown to consist of small bubbles of brown color. On these bubbles a number is written with one of the shade of red color bubbles. This would help in finding out the range which person is not able to see. The system now shows images one by one with various shades of red to the user. The user responds whether he is able to see the number or not.

The shade at which user is not able to see the number becomes the start of spectrum. The system will keep on showing the user the image with increasing intensity of red color. The point at which the user again starts seeing the number on the image would become the end of spectrum. This would provide a range or spectrum which user is not able to see. Other modifications are contemplated. For example, while only a single color scheme has been described herein, the system is able to assess shades of other color as well.

Next, the analyzer upon receiving the input from the color blindness detector replaces the specified color pixels with color pixels of lower RGB values. Since it will be appreciated by the person skilled in the art that the RGB value of black color is least among all the colors and 000, the replacement can be alternately performed in two ways. In one aspect, the analyzed pixels can be replaced with black color. In yet another aspect, the system preferably replaces the specified pixels with the color of darker shade which doesn't fall under the blind color spectrum of the user.

The process discussed here-above saves considerable amount of battery consumption. This also enables the picture to be seen by a color blind person in an approximate manner or a distorted manner based on the average or maximum power settings chosen by the user of the phone.

Figure 1:
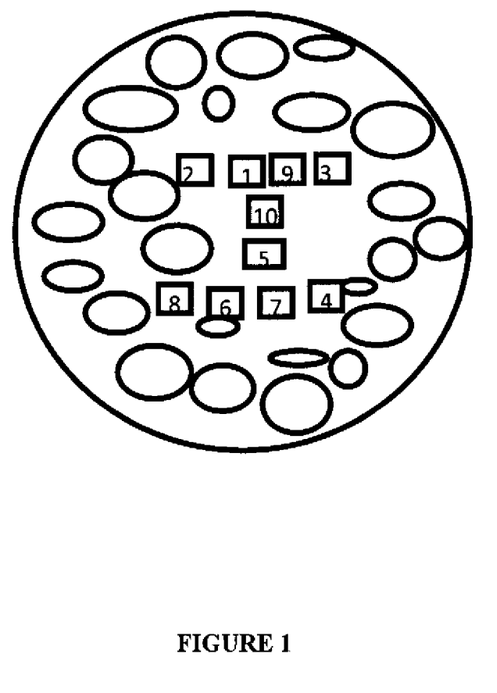
FIG. 1 illustrates an image displayed for detecting the color to which user is color deficient, in accordance with one exemplary embodiment of the present invention.

Referring now to FIG. 1, a user detected of a specific color deficient is shown a circle embodying plurality of small circles of specific color; say for example yellowish greenish color. Along with these small circle the large circle will also contain few circle, numbered alphabetically or otherwise, like from a to j, with shades of red color, which collaboratively represents some number or alphabet. The user is then asked to tell the number/alphabet written in the large circle via small red color circles.

Every color displayed on screen consists of RGB (Red, Green and Blue) components. It is represented as a triplet where R, G and B are values for Red, Green and Blue color components. Considering that a byte is used to represent each of these components then each of them can take $2^8=256$ values (0 to 255). For example, (0, 0, 0) Black; (255, 0, 0) Red; (0, 255, 0) Green; (0, 0, 255) Blue; (255, 255, 255) White Hence, there are $256^2 2^{24}=1,67,77,216=(\sim 16.7$ million) possible colors. Since mobile phones are composed of pixels, each pixel can take any value out of these 16.7 million possible values.

In an embodiment, it is assumed that for a given RGB value of a color "C", a series 'S' of RGB values can be calculated, which will represent shades of the color 'C'. Initial triplet of this series would be triplet (255, 255, 255) representing white color. Then, as traverse the series from start to end, different shades of color 'C' from light to dark can be seen. The last shade (triplet) of the series is black color (0, 0, 0).

The series S will look like: (255, 255, 255), (r1, g1, b1), (r2, g2, b2) . . . , (rk−1, gk−1, bk−1), (r, g, b)=C, (rk+1, gk+1, bk+1), (rk+2, gk+2, bk+2), . . . , (0, 0, 0).

Supposing that there are 'n' triplets in the series, (255, 255, 255) becomes the first element, (r, g, b) is the kth element and (0, 0, 0) is nth element.

Now if a bell curve is drawn with these values (with mean 0 and variance 1) then, $$y=\exp(-x^2/2)$$

Figure 2A:
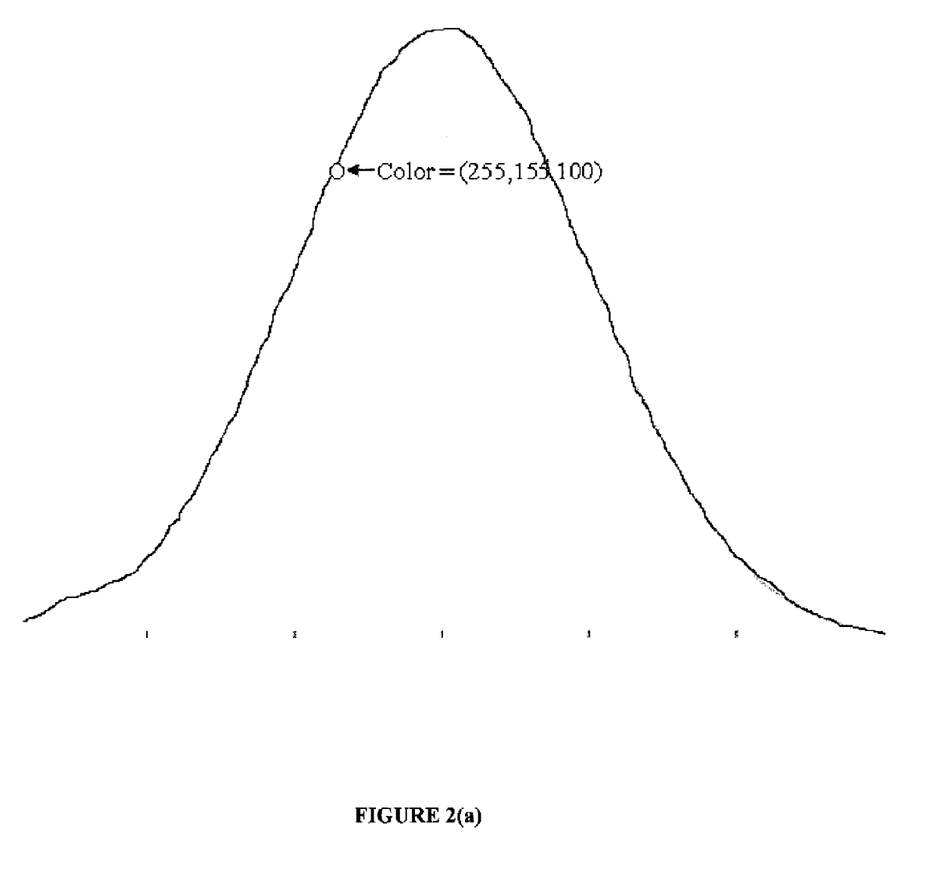
FIGS. 2(a) and 2(b) are illustrations depicting bell curves drawn for colors detected invisible to a partial color blind user, in one other embodiment of the present invention.
Figure 2B:
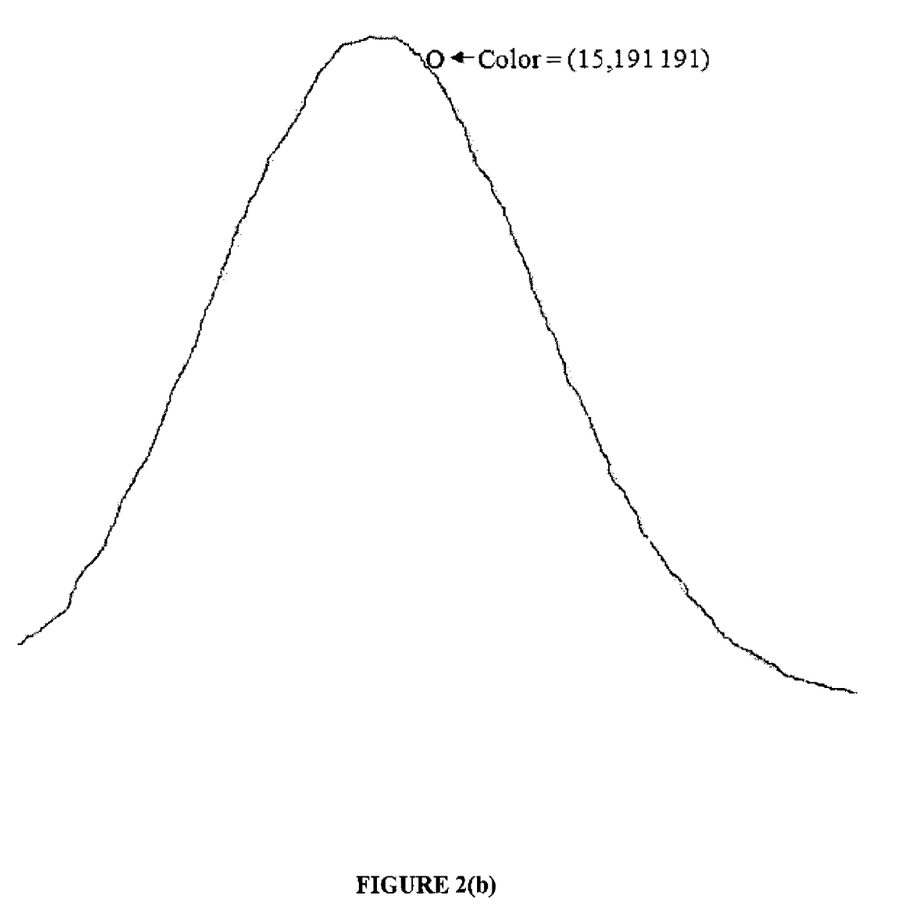

Using 'n' equidistant points in an interval [−a, a], where 'a' is some real number, values of 'y(i)' for i=1 to 'n' using ith triplet in the series is plotted over a bell curve. In this way there would be a point on the bell curve which would be drawn using the color 'C'. For instance, Referring to FIG. 2(a) and FIG. 2(b), the bell curves for color triplet (255, 155, 0) and (15, 191, 191) are drawn for illustrative purposes. The figures suggest the ways to plot the pixels on the curve along with shades accompanying it.

Now, let the color 'C' is assumed to be represented as a triplet (r, g, b). Following method (a code written in matlab) shows how to calculate values of triplets in the series 'S'.

```
max_r_g_b = max(max(r, g), b)
r_step = r / max_r_g_b
g_step = g / max_r_g_b
b_step = b / max_r_g_b
r_actual =r;
g_actual = g;
b_actual =b;
r1 = r; g1 = g; b1 =b;
A = [A; r1 g1 b1]
While (r1>0 | g1>0 | b1>0)
  r1_actual = r_actual- r_step;
  g1_actual = g_actual- g_step;
  b1_actual = b_actual- b_step;
  r1 = round(r1_actual)
  g1 = round(g1_actual)
  b1 = round(b1_actual)
  A = [A; r1 g1 b1]
  r_actual =r1_actual;
  g_actual = g1_actual ;
  b_actual =b1_actual ;
end
darker_shades = A;
A = [ ];
max_r_g_b = max(max(255-r, 255-g), 255-b)
r_step = (255-r) / max_r_g_b
g_step = (255-g) / max_r_g_b
b_step = (255-b) / max_r_g_b
r_actual = r;
g_actual = g;
b_actual = b;
r1 = r;
g1 = g;
b1 = b;
A = [A; r1 g1 b1]
While (r1>0 | g1>0 | b1 >0)
  r1_actual = r_actual+ r_step;
  g1_actual = g_actual+ g_step;
  b1_actual = b_actual+ b_step;
  r1 = round(r1_actual)
  g1 = round(g1 _actual)
  b1 = round(b1_actual)
  A = [A; r1 g1 b1]
  r_actual =r1_actual;
  g_actual = g1_actual ;
  b_actual =b1_actual ;
end
lighter_shades = reverse(A);
color_shades = [lighter_shades; darker shades]
S = color_shades;
```

For example if C = (255,155,100) then series for 'C' obtained is:

| 255 | 255 | 255 | - White (255,255,255) | | | | |
|---|---|---|---|---|---|---|---|
| 255 | 254 | 254; | 255 | 254 | 253; | 255 | 253 | 252; | 255 | 252 | 251; |
| 255 | 252 | 250; | 255 | 251 | 249; | 255 | 250 | 248; | 255 | 250 | 247; |
| 255 | 249 | 246; | 255 | 249 | 245; | 255 | 248 | 244; | 255 | 247 | 243; |
| 255 | 247 | 242; | 255 | 246 | 241; | 255 | 245 | 240; | 255 | 245 | 239; |
| 255 | 244 | 238; | 255 | 243 | 237; | 255 | 243 | 236; | 255 | 242 | 235; |
| 255 | 241 | 234; | 255 | 241 | 233; | 255 | 240 | 232; | 255 | 240 | 231; |
| 255 | 239 | 230; | 255 | 238 | 229; | 255 | 238 | 228; | 255 | 237 | 227; |
| 255 | 236 | 226; | 255 | 236 | 225; | 255 | 235 | 224; | 255 | 234 | 223; |
| 255 | 234 | 222; | 255 | 233 | 221; | 255 | 232 | 220; | 255 | 232 | 219; |
| 255 | 231 | 218; | 255 | 230 | 217; | 255 | 230 | 216; | 255 | 229 | 215; |
| 255 | 229 | 214; | 255 | 228 | 213; | 255 | 227 | 212; | 255 | 227 | 211; |
| 255 | 226 | 210; | 255 | 225 | 209; | 255 | 225 | 208; | 255 | 224 | 207; |
| 255 | 223 | 206; | 255 | 223 | 205; | 255 | 222 | 204; | 255 | 221 | 203; |
| 255 | 221 | 202; | 255 | 220 | 201; | 255 | 220 | 200; | 255 | 219 | 199; |
| 255 | 218 | 198; | 255 | 218 | 197; | 255 | 217 | 196; | 255 | 216 | 195; |
| 255 | 216 | 194; | 255 | 215 | 193; | 255 | 214 | 192; | 255 | 214 | 191; |
| 255 | 213 | 190; | 255 | 212 | 189; | 255 | 212 | 188; | 255 | 211 | 187; |
| 255 | 210 | 186; | 255 | 210 | 185; | 255 | 209 | 184; | 255 | 209 | 183; |
| 255 | 208 | 182; | 255 | 207 | 181; | 255 | 207 | 180; | 255 | 206 | 179; |
| 255 | 205 | 177; | 255 | 205 | 178; | 255 | 204 | 176; | 255 | 203 | 175; |
| 255 | 203 | 174; | 255 | 202 | 173; | 255 | 201 | 172; | 255 | 201 | 171; |
| 255 | 200 | 170; | 255 | 200 | 169; | 255 | 199 | 168; | 255 | 198 | 167; |
| 255 | 198 | 166; | 255 | 197 | 165; | 255 | 196 | 164; | 255 | 196 | 163; |
| 255 | 195 | 162; | 255 | 194 | 161; | 255 | 194 | 160; | 255 | 193 | 159; |
| 255 | 192 | 158; | 255 | 192 | 157; | 255 | 191 | 156; | 255 | 190 | 155; |
| 255 | 190 | 154; | 255 | 189 | 153; | 255 | 189 | 152; | 255 | 188 | 151; |
| 255 | 187 | 150; | 255 | 187 | 149; | 255 | 186 | 148; | 255 | 185 | 147; |
| 255 | 185 | 146; | 255 | 184 | 145; | 255 | 183 | 144; | 255 | 183 | 143; |
| 255 | 182 | 142; | 255 | 181 | 141; | 255 | 181 | 140; | 255 | 180 | 139; |
| 255 | 180 | 138; | 255 | 179 | 137; | 255 | 178 | 136; | 255 | 178 | 135; |
| 255 | 177 | 134; | 255 | 176 | 133; | 255 | 176 | 132; | 255 | 175 | 131; |
| 255 | 174 | 130; | 255 | 174 | 129; | 255 | 173 | 128; | 255 | 172 | 127; |
| 255 | 172 | 126; | 255 | 171 | 125; | 255 | 170 | 124; | 255 | 170 | 123; |
| 255 | 169 | 122; | 255 | 169 | 121; | 255 | 168 | 120; | 255 | 167 | 119; |
| 255 | 167 | 118; | 255 | 166 | 117; | 255 | 165 | 116; | 255 | 165 | 115; |
| 255 | 164 | 114; | 255 | 163 | 113; | 255 | 163 | 112; | 255 | 162 | 111; |
| 255 | 161 | 110; | 255 | 161 | 109; | 255 | 160 | 108; | 255 | 160 | 107; |
| 255 | 159 | 106; | 255 | ;58 | 105; | 255 | 158 | 104; | 255 | 157 | 103; |
| 255 | 156 | 102; | 255 | 156 | 101; | | | | | | |
| 255 | 155 | 100 | - C= (255,155,100) | | | | |
| 254 | 154 | 100; | 253 | 154 | 99; | 252 | 153 | 99; | 251 | 153 | 98; |
| 250 | 152 | 98; | 249 | ;51 | 98; | 248 | 151 | 97; | 247 | 150 | 97; |
| 246 | 150 | 96; | 245 | 149 | 96; | 244 | 148 | 96; | ;43 | 148 | 95; |
| 242 | 147 | 95; | 241 | 146 | 95; | 240 | 146 | 94; | 239 | 145 | 94; |
| 238 | 145 | 93; | 237 | 144 | 93; | 236 | 143 | 93; | 235 | 143 | 92; |
| 234 | 142 | 92; | 233 | 142 | 91; | 232 | 141 | 91; | 231 | 140 | 91; |
| 230 | 140 | 90; | 229 | 139 | 90; | 228 | 139 | 89; | 227 | 138 | 89; |

-continued

| | | | | | | | | | | |
|---|---|---|---|---|---|---|---|---|---|---|
| 226 | 137 | 89; | 225 | 237 | 88; | 224 | 136 | 88; | 223 | 136 | 87; |
| 222 | 135 | 87; | 221 | 134 | 87; | 220 | 134 | 86; | 219 | 133 | 86; |
| 218 | 133 | 85; | 217 | 132 | 85; | 216 | 131 | 85; | 215 | 131 | 84; |
| 214 | 130 | 84; | 213 | 129 | 84; | 212 | 129 | 83; | 211 | 128 | 83; |
| 210 | 128 | 82; | 209 | 127 | 82; | 208 | 126 | 82; | 207 | 126 | 81; |
| 206 | 125 | 81; | 205 | 125 | 80; | 204 | 124 | 80; | 203 | 123 | 80; |
| 202 | 123 | 79; | 201 | 122 | 79; | 200 | 122 | 78; | 199 | 121 | 78; |
| 198 | 120 | 78; | 197 | 120 | 77; | 196 | 119 | 77; | 195 | 119 | 76; |
| 194 | 118 | 76; | 193 | 117 | 76; | 192 | 117 | 75; | 191 | 116 | 75; |
| 190 | 115 | 75; | 189 | 115 | 74; | 188 | 114 | 74; | 187 | 114 | 73; |
| 186 | 113 | 73; | 185 | 112 | 73; | 184 | 112 | 72; | 183 | 111 | 72; |
| 182 | 111 | 71; | 181 | 110 | 71; | 180 | 109 | 71; | 179 | 109 | 70; |
| 178 | 108 | 70; | 177 | 108 | 69; | 176 | 107 | 69; | 175 | 106 | 69; |
| 174 | 106 | 68; | 173 | 105 | 68; | 172 | 105 | 67; | 171 | 104 | 67; |
| 170 | 103 | 67; | 169 | 103 | 66; | 168 | 102 | 66; | 167 | 102 | 65; |
| 166 | 101 | 65; | 165 | 100 | 65; | 164 | 100 | 64; | 163 | 99 | 64; |
| 162 | 98 | 64; | 161 | 98 | 63; | 160 | 97 | 63; | 159 | 97 | 62; |
| 158 | 96 | 62; | 157 | 95 | 62; | 156 | 95 | 61; | 155 | 94 | 61; |
| 154 | 94 | 60; | 153 | 93 | 60; | 152 | 92 | 60; | 151 | 92 | 59; |
| 150 | 91 | 59; | 149 | 91 | 58; | 148 | 90 | 58; | 147 | 89 | 58; |
| 146 | 89 | 57; | 145 | 88 | 57; | 144 | 88 | 56; | 143 | 87 | 56; |
| 142 | 86 | 56; | 141 | 86 | 55; | 140 | 85 | 55; | 139 | 84 | 55; |
| 138 | 84 | 54; | 137 | 83 | 54; | 136 | 83 | 53; | 135 | 82 | 53; |
| 134 | 81 | 53; | 133 | 81 | 52; | 132 | 80 | 52; | 131 | 80 | 51; |
| 130 | 79 | 51; | 129 | 78 | 51; | 128 | 78 | 50; | 127 | 77 | 50; |
| 126 | 77 | 49; | 125 | 76 | 49; | 124 | 75 | 49; | 123 | 75 | 48; |
| 112 | 74 | 48; | 121 | 74 | 47; | 120 | 73 | 47; | 119 | 72 | 47; |
| 118 | 72 | 46; | 117 | 71 | 46; | 116 | 71 | 45; | 115 | 70 | 45; |
| 114 | 69 | 45; | 113 | 69 | 44; | 112 | 68 | 44; | 111 | 67 | 44; |
| 110 | 67 | 43; | 109 | 66 | 43; | 108 | 66 | 42; | 107 | 65 | 42; |
| 106 | 64 | 42; | 105 | 64 | 41; | 104 | 63 | 41; | 103 | 63 | 40; |
| 102 | 62 | 40; | 101 | 61 | 40; | 100 | 61 | 39; | 99 | 60 | 39; |
| 98 | 60 | 38; | 97 | 59 | 38; | 96 | 58 | 38; | 95 | 58 | 37; |
| 94 | 57 | 37; | 93 | 57 | 36; | 92 | 56 | 36; | 91 | 55 | 36; |
| 90 | 55 | 35; | 89 | 54 | 35; | 88 | 53 | 35; | 87 | 53 | 34; |
| 86 | 52 | 34; | 85 | 52 | 33; | 84 | 51 | 33; | 83 | 50 | 33; |
| 82 | 50 | 32; | 81 | 49 | 32; | 80 | 49 | 31; | 79 | 48 | 31; |
| 78 | 47 | 31; | 77 | 47 | 30; | 76 | 46 | 30; | 75 | 46 | 29; |
| 74 | 45 | 29; | 73 | 44 | 29; | 72 | 44 | 28; | 71 | 43 | 28; |
| 70 | 43 | 27; | 69 | 42 | 27; | 68 | 41 | 27; | 67 | 41 | 26; |
| 66 | 40 | 26; | 65 | 40 | 25; | 64 | 39 | 25; | 63 | 38 | 25; |
| 62 | 38 | 24; | 61 | 37 | 24; | 60 | 36 | 24; | 59 | 36 | 23; |
| 58 | 35 | 23; | 57 | 35 | 22; | 56 | 34 | 22; | 55 | 33 | 22; |
| 54 | 33 | 21; | 53 | 32 | 21; | 52 | 32 | 20; | 51 | 31 | 20; |
| 50 | 30 | 20; | 49 | 30 | 19; | 48 | 29 | 19; | 47 | 29 | 18; |
| 46 | 28 | 18; | 45 | 27 | 18; | 44 | 27 | 17; | 43 | 26 | 17; |
| 42 | 26 | 16; | 41 | 25 | 16; | 40 | 24 | 16; | 39 | 24 | 15; |
| 38 | 23 | 15; | 37 | 22 | 15; | 36 | 22 | 14; | 35 | 21 | 14; |
| 34 | 21 | 13; | 33 | 20 | 13; | 32 | 19 | 13; | 31 | 19 | 12; |
| 30 | 18 | 12; | 29 | 18 | 11; | 28 | 17 | 11; | 27 | 16 | 11; |
| 26 | 16 | 10; | 25 | 15 | 10; | 24 | 15 | 9; | 23 | 14 | 9; |
| 22 | 13 | 9; | 21 | 13 | 8; | 20 | 12 | 8; | 19 | 12 | 7; |
| 18 | 11 | 7; | 17 | 10 | 7; | 16 | 10 | 6; | 15 | 9 | 6; |
| 14 | 9 | 5; | 13 | 8 | 5; | 12 | 7 | 5; | 11 | 7 | 4; |
| 10 | 6 | 4; | 9 | 5 | 4; | 8 | 5 | 3; | 7 | 4 | 3; |
| 6 | 4 | 2; | 5 | 3 | 2; | 4 | 2 | 2; | 3 | 2 | 1; |
| 2 | 1 | 1; | 1 | 1 | 0; | 0 | 0 | 0 - Black= (255,0,0) | | | |

In yet another embodiment, the method of present invention identifies all colors with their RGB values, used by an application. This is referred as, for say, colors_used. Now, for each, a curve corresponding to colors in colors_used is drawn. For each color on the curve starting from left end of bell curve to right end of bell curve, image of that color is shown to the user and see whether he is able to identity that color or not. While doing this activity there would be a color which user cannot identify.

Note the previous color as point P_left (r1, g1, b1). User would not be able to identify some more colors. After showing few more colors there would be a point from which he would be able to identify the color. Note that point as P_right (rr, gr, br). These points respectively denote the start and end of color deficient spectrum.

Since display of each color will consume some power, let the power consumed to display color P_left is pow_left. Similarly, let the power consumed to display color P_right is pow_right. Say there are B number of colors between P_left and P_right. All these colors are not identified by a partially color blind user hence these colors are prevented from being seen to the user. However, the user can see colors up to P_left and colors beyond the point P_right.

Figure 3:
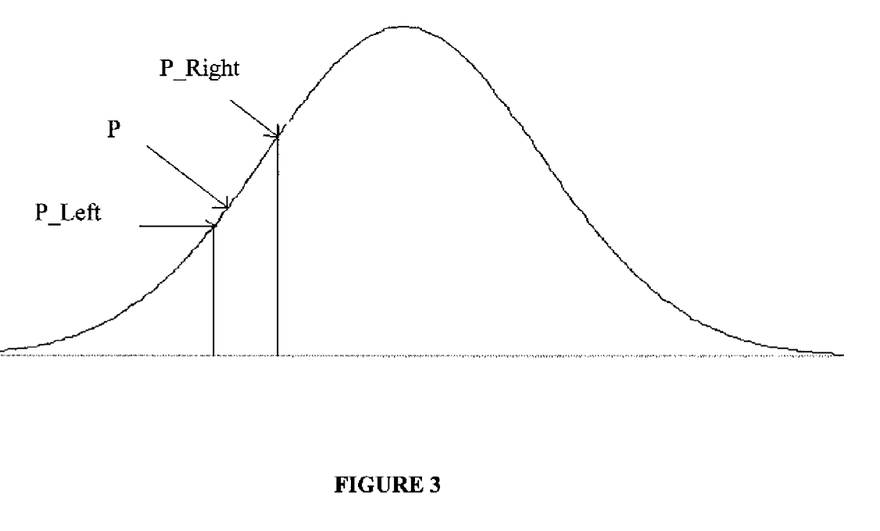
FIG. 3 illustrates selection of a user color deficient spectrum, in one of the other possible embodiments of the present invention.

Now instead of showing the color out of those B colors color p_left or p_right is shown depending on which color takes less power to display. (Probably p_right should take less power as it would have more black components). It is also noted that color black (K) takes the least power to display. Let a color 'C' is represented as point 'P' on the bell curve, as shown in FIG. 3, and that let color is not seen by a partially color blind person. Then that color will be one of those 'B' colors mentioned above. Now the replacement of the colors will be as shown:

P_left if pow_P>pow_left
P_right if pow_P>pow_right

Mostly second condition will always be true as P_right will take less power than P_left and 'P' lies in between P_left and P_right. By this, a power consumption of delta=(pow_P−pow_right) will be saved for each color out of those 'B' colors. Hence power up to delta*B' can be saved where B'=Number of colors out of those B colors which would be present in application/website. In a nutshell, the present invention determines the color range which would not be identifiable to a color blind person to be replaced with a color of most efficient RGB value of same color. This new shade would consume less power than a pixel drawn on a screen with the original color that will ultimately help in reducing the battery consumption.

The systems and methods described herein provide an alternate way to visually present information, and in particular color information to a user. These systems have wide applicability, including for providing systems that make it easier for a user to distinguish color coded information presented in any format, including graphics. To this end, the systems and method described herein, inter alai, provide a user with color information in a format that can be perceived by a person with impaired color-vision on a display device that in turn consumes much less power.

The invention claimed is:

1. An image processing method generating a customized image for a partial color deficient user over a display device, the image processing method comprising:
    detecting a color for which a user is deficient in identifying the color, wherein the color is detected by displaying one or more images comprising a plurality of shades of the color to the user, wherein the plurality of shades comprise an increasing order of intensity of the color;
    determining a spectrum of the color based upon the plurality of shades, wherein the spectrum comprises a start and an end, wherein the start indicates a shade at which the user fails to identify the color, and wherein the end indicates a shade at which the user identifies the color;
    identifying color pixels corresponding to the spectrum, wherein the color pixels comprise Red, Green, and Blue (RGB) values;
    replacing the RGB values of the color pixels with previously computed RGB values corresponding to:
        a black color; or
        a darker shade of the color, wherein the darker shade does not fall between the start and the end of the spectrum in order to generate a customized image capable of minimizing an operating power of the display device, wherein the operating power, consumed by the display device, is minimized up to difference between powers consumed by a lower shade color pixel replacing the user color deficient pixels and the color pixel determining the end of the spectrum; and wherein the previously computed RGB values comprises lower RGB values than the RGB values of the color pixels.

2. The image processing method of claim 1, wherein the plurality of shades are arranged in an organized array sequenced in an order of decreasing intensity for display, whereby a first shade of the spectrum that remains invisible to the user is determined as the start of the spectrum and a subsequent shade at which the user starts viewing a color shade is determined as the end of the spectrum.

3. The image processing method of claim 1, wherein the color pixels identified corresponding to the user color deficient are replaced with a darker shade of lower red-green-blue value, said darker shade falling outside the user deficient color spectrum.

4. An image processing system generating a customized image for a partial color deficient user over a display device, the image processing system comprising:
   a detector for
      detecting a color for which a user is deficient in identifying the color, wherein the color is detected by displaying one or more images comprising a plurality of shades of the color, wherein the plurality of shades comprise an increasing order of intensity of the color, and
      determining a spectrum of the color based on upon the plurality of shades, wherein the spectrum comprises a start and an end, wherein the start indicates a shade at which the user fails to identify the color, and wherein the end indicates a shade at which the user identifies the color;
   an analyzer for identifying color pixels corresponding to the spectrum wherein the color pixels comprise Red, Green, and Blue (RGB) values; and
   an image modifier for replacing the RGB values of the color pixels with previously computed RGB values corresponding to
      a black color; or
      a darker shade of the color, wherein the darker shade does not fall between the start and the end of the spectrum in order to generate a customized image capable of minimizing an operating power of the display device, wherein the operating power, consumed by the display device, is minimized up to difference between powers consumed by a lower shade color pixel replacing the user color deficient pixels and the color pixel determining the end of the spectrum;
      and wherein the previously computed RGB values comprises lower RGB Values than the RGB values of the color pixels.

5. The image processing system of claim 4, wherein the detector detects the plurality of shades arranged in an organized array sequenced in an order of decreasing intensity for display, and determines a first shade of the spectrum that remains invisible to the user as the start of spectrum and a subsequent shade at which the user starts viewing a color shade as the end of the spectrum.

6. The image processing system of claim 4, wherein the image modifier replaces the color pixels identified corresponding to the user color deficient with a darker shade of lower red-green-blue value, said darker shade falling outside the user deficient color spectrum.

* * * * *